United States Patent [19]

Siemann

[11] Patent Number: 4,650,165

[45] Date of Patent: Mar. 17, 1987

[54] GAS SPRING

[75] Inventor: Martin Siemann, Bad Breisig, Fed. Rep. of Germany

[73] Assignee: Stabilus GmbH, Fed. Rep. of Germany

[21] Appl. No.: 672,092

[22] Filed: Nov. 15, 1984

[30] Foreign Application Priority Data

Nov. 24, 1983 [DE] Fed. Rep. of Germany ....... 3342404

[51] Int. Cl.$^4$ ............................ F16F 9/02; F16F 9/32; E05F 3/00; B62D 25/00
[52] U.S. Cl. ................................ 267/64.11; 188/300; 267/120; 296/56
[58] Field of Search ............... 267/64.11, 64.12, 64.13, 267/64.15, 113, 120, 124; 188/282, 284, 288, 188/300, 313, 316, 317; 16/66; 296/56, 57A; 160/189, 190

[56] References Cited

U.S. PATENT DOCUMENTS

| | | | |
|---|---|---|---|
| 3,938,793 | 2/1976 | Kaptanis et al. | 267/120 |
| 4,166,612 | 9/1979 | Freitag et al. | 267/64.15 |
| 4,221,367 | 9/1980 | Smith | 267/64 |
| 4,230,309 | 10/1980 | Schnitzius | 267/120 |
| 4,240,619 | 12/1980 | Wirges et al. | 267/64.11 |
| 4,323,224 | 4/1982 | Freitag | 267/64.12 |

FOREIGN PATENT DOCUMENTS

| | | |
|---|---|---|
| 2659488 | 12/1976 | Fed. Rep. of Germany . |
| 7833766 | 11/1978 | Fed. Rep. of Germany . |
| 2905030 | 2/1979 | Fed. Rep. of Germany . |
| 2809203 | 9/1979 | Fed. Rep. of Germany . |
| 1504941 | 12/1966 | France . |
| 944596 | 12/1963 | United Kingdom . |
| 1284265 | 8/1972 | United Kingdom . |
| 1411218 | 10/1975 | United Kingdom . |
| 2087510 | 5/1982 | United Kingdom . |

Primary Examiner—Andres Kashnikow
Assistant Examiner—Robert J. Oberleitner
Attorney, Agent, or Firm—Brumbaugh, Graves, Donohue & Raymond

[57] ABSTRACT

Gas springs are frequently used for assisting the movement of a movable construction unit, e.g. a boot lid with respect to a stationary construction unit, e.g. a motor car frame. In view of facilitating the closing operation of the boot lid, the pressure in the gas spring is sometimes selected such that the gas spring cannot fully overcome the gravitational forces acting onto the boot lid. In such cases the gas spring cannot fulfill the function of maintaining the boot lid in the upper terminal, i.e. the fully opened position without additional provision. In order to enable the gas spring to maintain the boot lid in the upper terminal position, the gas spring is constructed such that in the outer terminal position of the piston rod with respect to the cylinder an increased resistance is exerted by the gas spring against pushing the piston rod inwards of the cylinder. A simple and economic hydraulic circuit is proposed in view of achieving such increased resistance.

14 Claims, 4 Drawing Figures

GAS SPRING

BACKGROUND OF THE INVENTION

Gas springs are frequently used for assisting the movement of hand-operated movable construction units with respect to stationary construction units against gravitational forces. Gas springs are e.g. used for assisting the movement of boot lids and engine bonnets with respect to the respective vehicle. It is not always desirable that the gas spring is strong enough to lift the boot lid or the like without additonal manipulation by hand. In such cases the gas spring does not fulfil the function of holding the boot lid in the fully opened position if desired. Specific provisions are needed in view of this function to be fulfilled by the gas spring. These provisions made the gas springs rather complicated and expensive in the past.

STATEMENT OF THE PRIOR ART

In German 'Offenlegunsschrift' No. 26 59 488 the gas spring is provided with a second piston besides the main piston, which second piston has a smaller diameter and dives into a cylinder section of adapted diameter. This second piston comprises a first valve which opens in the outward movement of the piston rod and a second, pressure-dependently acting valve which opens in the inward movement of the piston rod. So the installation for increasing resistance against inward pushing of the piston rod is relatively complicated and expensive in construction, since an additional piston with piston valves must be provided. Furthermore the arrangement of the pressure-dependent valve is disadvantageous, for such a valve is very expensive on account of constant valve spring bias.

OBJECT OF THE INVENTION

It is the object of the present invention to provide a gas spring in which an increased resistance of the piston rod against inward movement in the section of movement adjacent the outermost position is achieved with a less complicated and a more economic construction.

SUMMARY OF THE INVENTION

A gas spring comprises a cylinder member having an axis and two ends, namely a first end and a second end. The first end is closed and the second end is provided with a piston rod guiding and sealing unit. A cavity is defined within said cylinder member between said two ends. A piston-piston rod unit is provided within the cylinder member. This piston-piston rod unit includes a piston rod member extending along the axis inwardly and outwardly of the cavity through the piston rod guiding and sealing unit. The piston rod member is mounted for axial movement with respect to the cylinder member along a path of movement between an inner terminal position and an outer terminal position. The piston-piston rod unit further includes a piston unit connected to the piston rod member within the cavity. The piston unit divides the cavity into two working chambers, a first working chamber adjacent the first end of the cylinder member and a second working chamber adjacent the second end of the cylinder member. Passage means interconnect the first and the second working chambers. These passage means include a first flow path and a second flow path. The first flow path contains a first valve unit. This first valve unit is responsive to the direction of movement of the piston rod member with respect to the cylinder member such as to close the first flow path on inward movement of the piston rod member with respect to the cylinder member and to open the first flow path on outward movement of the piston rod member with respect to the cylinder member. The second flow path passes through the piston-piston rod unit. A first end of the second flow path opens into the first working chamber. A second end of the second flow path is axially spaced from the piston unit and opens into the second working chamber until the piston unit passes a particular point in its travel from the retracted position to its extended position. For piston travel beyond such point, however, the second flow path no longer opens into the second working chamber.

Separating means are provided for separating the second end of the second flow path from the second working chamber in response to the axial position of the piston rod member with respect to the cylinder member. These separating means separate the second end of the second flow path from the second working chamber only within a terminal section of the axial path of movement adjacent the outer terminal position of the piston rod member. Except for this terminal section the second end of the second flow path is open to the second working chamber.

The resistance against pushing the piston rod member into the cavity in a section of movement adjacent the outer terminal position of the piston rod member may be varied in accordance with an additional feature of this invention by a construction in which the separating means comprise an annular separating wall fixed with respect to the cylinder member surrounding the piston rod member and provided with a sealing ring sealingly engaging the piston rod member. In such a construction an annular chamber may be defined around the piston rod member axially between the piston rod guiding and sealing unit and the annular separating wall. A section of the piston rod member adjacent the piston unit may be provided with a diameter larger than the remaining section of the piston rod member which passes through the piston rod sealing and guiding unit. This section of larger diameter enters into the annular chamber when the piston rod member is within the terminal section of axial movement. By varying said larger diameter, the resistance against inward movement of the piston rod member in the section of movement adjacent the outermost position of the piston rod member can be varied.

The various features of novelty which characterize the invention are pointed out with particularity in the claims annexed to and forming a part of this disclosure. For a better unterstanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The invention will be explained in greater detail below by reference to the example of embodiment. In detail.

DESCRIPTION OF THE PREFERRED EMBODIMENT

The gas springs of this invention are intended to facilitate operation of motor vehicle boot lids, engine bonnets or other doors or flaps which are pivotable about a horizontal axis. In these cases a part of the weight of the flap is compensated by the gas spring, so that in the opening of the flap the operator has to exert only a slight force in the opening direction upon the flap. Furthermore the gas spring must be formed so that the flap is held in the opened position.

Figure 1:
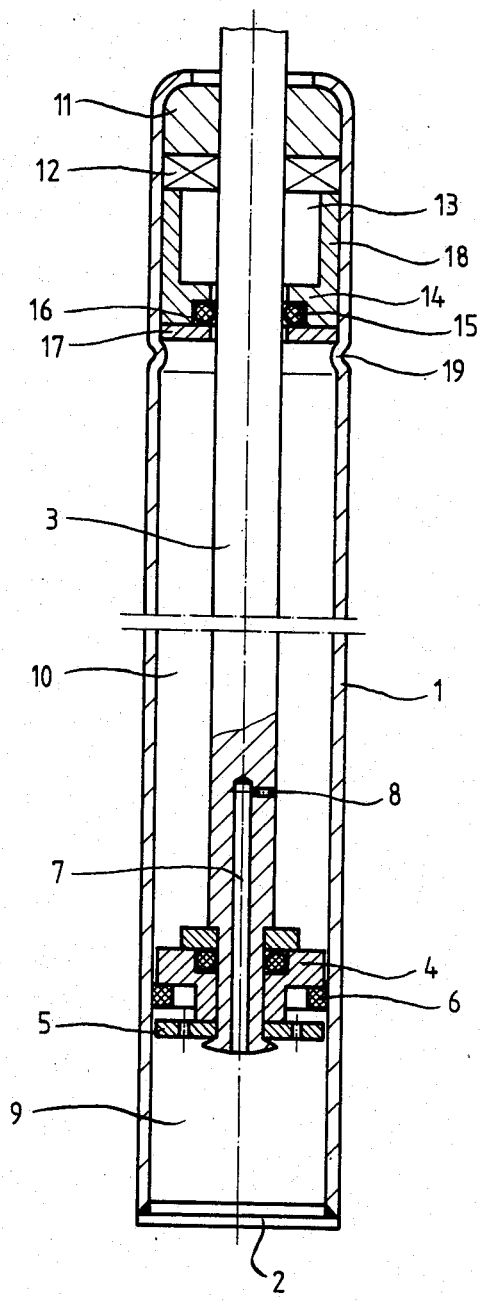
FIG. 1 shows a gas spring in longitudinal section.
Figure 2:
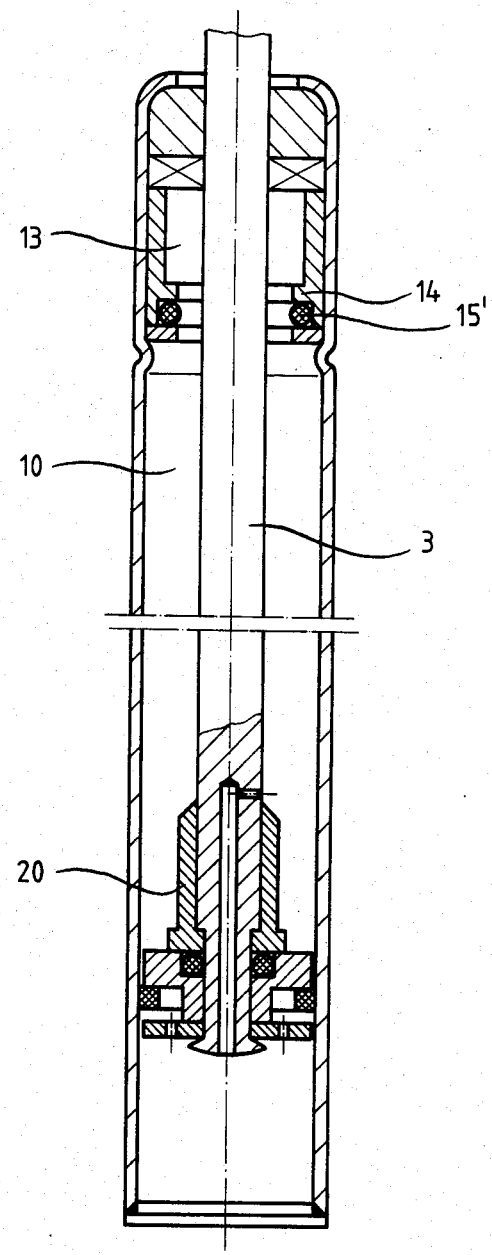
FIG. 2 shows a gas spring in longitudinal section where the piston rod is provided with an increased diameter adjacent the piston.

The gas spring according to FIGS. 1 and 2 consists of a cylinder member 1 which is closed at one end by an end wall 2. At the other end the cylinder member 1 shows a piston rod guiding member 11 and a piston rod sealing member 12 which together form a piston rod guiding and sealing unit 11, 12. For the arrangement of the gas spring for example between a boot lid of a vehicle and the vehicle bodywork the end wall is provided with an attachment eye (not shown) and the piston rod member protruding from the cylinder member 1 is likewise provided with an attachment eye (not shown) at the outer end. The end of the piston rod member 3 which extends into the cavity of the cylinder member 1 is firmly connected with a piston 4 which together with a piston disc 5 provided with passage cross-sections forms a piston groove in which a piston ring 6 is axially movably arranged. The elements 4, 5 and 6 define a piston unit; the elements 3, 4, 5 and 6 define a piston-piston rod unit. A constantly opened flow path 7, 8 (second flow path) between the first working chamber 9 and the second working chamber 10 is formed by a longitudinal bore 7 situated in the piston rod member 3 and a transverse bore 8 opening into this longitudinal bore 7. A first flow path is defined by a gap between the piston 4 and the inner face of the cylinder member 1. This gap is closed and opened by the piston ring 6 in response to the direction of movement of the piston rod member 3.

Between the piston rod guiding and sealing unit 11, 12 and the working chamber 10 an annular separating wall 14 is provided which accommodates a sealing ring 15 in a recess 16. The annular sealing ring 15 is held in the recess 16 by means of a cover plate 17. The axial length of the annular chamber 13 is fixed by a spacer sleeve 18 formed in one piece with the annular separating wall 14, the spacer sleeve 18 being pressed with its end face against the piston rod guiding and sealing unit 11, 12 and held in this position by several notchings or a circumferential corrugation 19 in the cylinder member 1.

In the form of embodiment according to FIG. 1 the sealing ring 15 rests on the surface of the piston rod member 3, while in FIG. 2 the piston rod member 3 has an increased diameter by a sleeve 20. In this case the separating wall 14 is adapted to the increased diameter.

Since the function of the gas spring is adequately known, the following description of function will discuss essentially the device for increasing inward movement resistance. To open the boot lid the operator must exert a slight force in the opening direction, since not all of the weight of the boot lid is compensated by the gas spring. As from the predetermined distance of outward movement of the piston rod member 3 out of the cylinder member 1, the transverse bore 8 traverses the annular sealing ring 15 and opens into the annular chamber 13. On further outward movement of the piston rod member 3 the gas flows from the working chamber 10 through the first flow path as defined above into the working chamber 9. On liberation of the boot lid the piston rod member 3 seeks to dive into the cylinder member 1, with the piston ring 6 abutting the piston 4 and thus sealing off the working chambers 10 and 9. Since the second flow path formed by the longitudinal bore 7 and the transverse bore 8 no longer opens into the working chamber 10, an increase of resistance against inward movement is generated and the boot lid remains in the desired position.

To close the boot lid a force in the closure direction must be exerted thereupon, until the transverse bore 8 has travelled across the sealing ring 15 and opens into the working chamber 10. Now the increased resistance is eliminated and the gas can flow through the second flow path formed by the transverse bore 8 and the longitudinal bore 7 from the working chamber 9 into the working chamber 10. The boot lid weight not compensated by the gas spring suffices to close the boot lid slowly.

The manner of operation of the gas spring as shown in FIG. 2 largely corresponds to that of FIG. 1. By reason of the added sleeve 20 on the piston rod member 3, here the sealing ring 15' rests on the added sleeve 20 only when the piston rod member 3 is in a section of movement adjacent the outermost position. In the rest of the path of movement of the piston rod the working chamber 10 is connected with the annular chamber 13.

Figure 3:
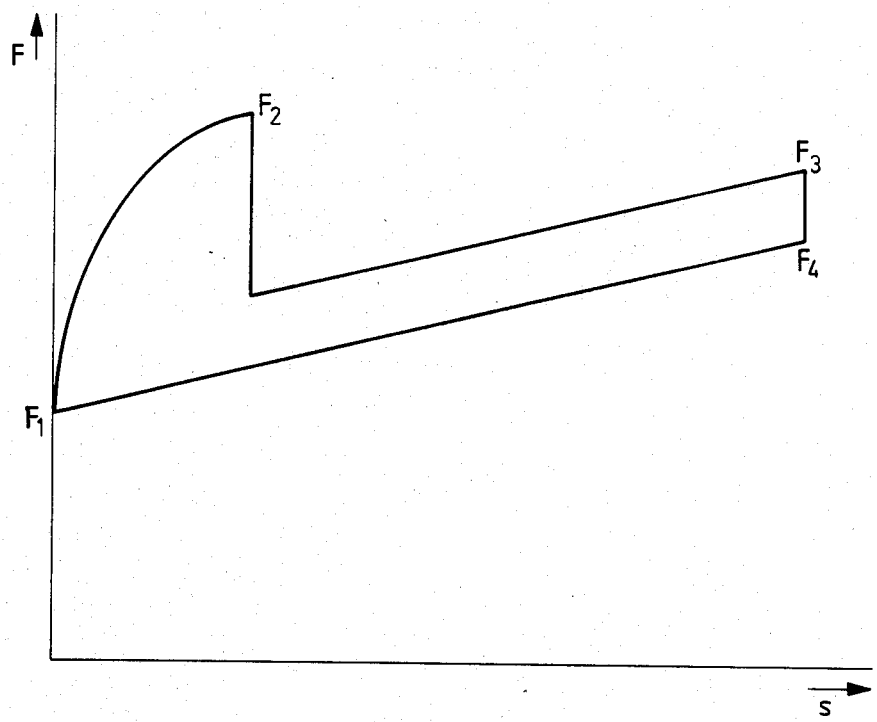
FIG. 3 shows a path of movement—force diagram of the gas spring.

In FIG. 3 there is shown the path of movement—force diagram of the gas spring. The point F1 corresponds to the outermost position of the piston rod. To close the boot lid a force must be exerted which corresponds to the point F2. In this point F2 the transverse bore 8 of the gas spring travels across the sealing ring 15 so that the resistance against inward movement—as already described—drops to the force resulting essentially from the pressure of the gas filling multiplied by the cross-sectional area of the piston rod member. On this inward thrust line the point F3 is reached, in which the piston rod member 3 is in its innermost position. The force exerted by the gas spring during outward movement of the piston rod 3 corresponds to the line F4–F1.

By appropriate variation of the added sleeve 20 it is possible to vary the resistance against inward movement of the piston rod member in the section of movement before the point F2 is reached.

Since the increased force is not effective when the piston rod member is in the innermost position, the force upon the hinges of a boot lid is relatively slight in this position.

It is readily possible to arrange a further corrugation as stop for the piston 4 at an axial interval from the corrugation 19 shown in FIG. 1 in order to vary the outermost position of the piston rod member.

The increase in resistance is correspondingly varied. The increase in resistance becomes greater if the path of movement of the transverse bore 8 beyond the sealing ring 15 becomes greater.

Figure 4:
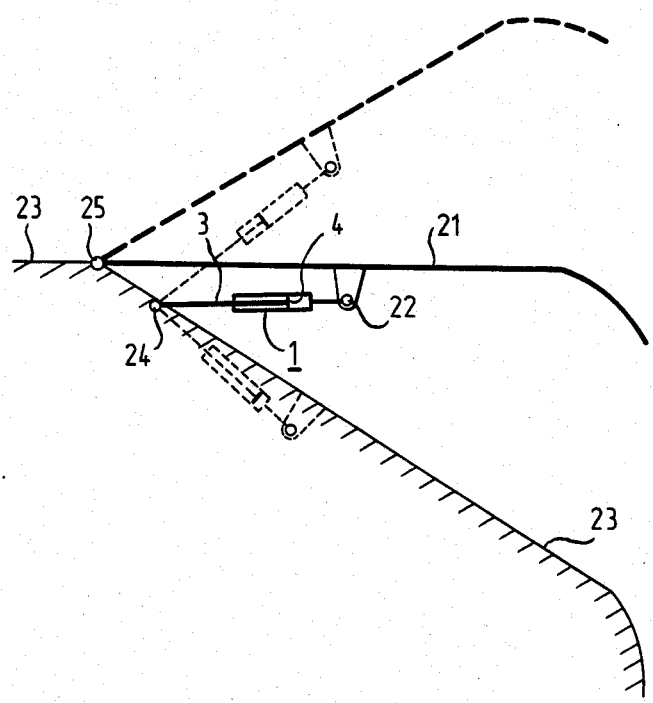
FIG. 4 shows the gas spring in connection with a boot lid.

In FIG. 4 the cylinder member 1 is pivotally connected to a boot lid 21 by a joint 22 and to the bodywork 23 of a motor vehicle by a joint 24. The boot lid 21 is connected to the bodywork 23 of a joint 25.

The dotted upper position of the boot lid 21 corresponds to the point F2 of FIG. 3.

The cavity 9, 10 may also be partially filled with a liquid. Moreover, the pressurized gas may be replaced by a volume balancing chamber which is defined by a movable membrane or separating wall and pressure maintaining means, e.g. a helical compression spring.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A spring device comprising a cylinder member having an axis and first and second ends, said first end being closed and said second end being provided with a piston rod guiding and sealing means, a cavity being defined within said cylinder member between said two ends;

piston-piston rod means including a piston rod member extending along said axis inwardly and outwardly of said cavity through said piston rod guiding and sealing means and being mounted for axial movement with respect to the cylinder member along a path of movement between an inner terminal position and an outer terminal position, and further including a piston means connected to said piston rod member within said cavity for dividing said cavity into first and second working chambers, the first working chamber adjacent the first end of the cylinder member and the second working chamber adjacent the second end of the cylinder member;

passage means for interconnnecting the first and second working chambers, said passage means forming a first flow path and a second flow path, said first flow path including a first valve means which is responsive to the direction of movement of the piston rod member with respect to the cylinder member such as to close the first flow path on inward movement and to open the first flow path on outward movement, said second flow path including an axial bore passing through the piston rod member and having an opening in the inner end of the piston rod member for opening into the first working chamber and a radial bore which is interconnected to the axial bore, passes through the piston rod member and has an opening in the side of the piston rod member, said opening in the side of the piston rod member opening into the second working chamber until the piston rod member in its travel from the inner terminal position to the outer terminal position reaches a terminal section as it approaches its outer terminal position;

the second flow path being open for flow in both directions for either direction of axial movement of the piston rod member between the first and second working chambers until the piston rod member reaches said terminal section, and means for fixing the position of said terminal section including means for separating the piston rod side opening of the second flow path from the second working chamber for both flow directions through said second flow path when the piston rod member reaches said terminal section, said fixing means including means forming an annular chamber between said second working chamber and the second end of the cylinder and means for completely blocking flow between said annular chamber and said second working chamber while the piston rod member reaches and passes above said terminal section.

2. A spring device as set forth in claim 1, said means for separating (14,15) comprising a separating structure fixed with respect to said cylinder member (1).

3. A spring device as set forth in claim 2, said separating structure comprising an annular separating fixed wall (14) surrounding said piston rod member (3) and being provided with a sealing ring (15) sealingly engaging said piston rod member (3).

4. A spring device as set forth in claim 3, said separating wall (14) being provided with an annular recess (16) which is open in one axial direction and is closed by an annular cover plate (17), said sealing ring (15) being received by said annular recess (16).

5. A spring device as set forth in claim 3, an annular chamber (13) being defined around said piston rod member (3) axially between said piston rod guiding and sealing unit (11, 12) and said annular separating wall (14).

6. A spring device as set forth in claim 5, said annular chamber (13) being limited in radially outward direction by a spacer sleeve (18) extending between said piston rod guiding and sealing unit (11, 12) and said annular separating wall (14).

7. A spring device as set forth in claim 6, said spacer sleeve (18) being integral with said annular separating wall (14).

8. A spring device as set forth in claim 1, said means for separating comprising an annular wall for surrounding the opening of the second flow path in the side of the piston rod member when the piston rod member is in the axial position corresponding to the terminal section for forming an annular chamber which is separate from the second working chamber a section (20) of said piston rod member (3) adjacent said piston unit having a diameter larger than the remaining section (20) of said piston rod member passing through said piston rod guiding and sealing unit (11,12), said section (20) with said larger diameter entering into said annular chamber (13) when said piston rod member (3) is within said terminal section of axial movement.

9. The spring device of claim 1 further characterized in that it further includes means forming in the cavity a volume balancing chamber between the first working chamber and the first end of the cylinder member and pressure maintaining means in said volume balancing chamber.

10. The spring device of claim 9 in which the pressure maintaining means is a helical spring.

11. The spring device of claim 10 in which the cavity is partially filled with a liquid.

12. A construction assembly comprising a basic construction unit and a moveable construction unit which is pivotally mounted with respect to said basic construction unit about a substantially horizontal axis for pivotal movement between a lower terminal position and an upper terminal position, and wich is subject to gravitational forces, and a spring device comprising a cylinder member having an axis and first and second ends, said first end being closed and said second end being provided with a piston rod guiding and sealing means, a cavity being defined within said cylinder member between said two ends;

piston-piston rod means including a piston rod member extending along said axis inwardly and outwardly of said cavity through said piston rod guiding and sealing means and being mounted for axial movement with respect to the cylinder member along a path of movement between an inner terminal position and an outer terminal position, and further including a piston means connected to said piston rod member within said cavity for dividing said cavity into first and second working chambers, the first working chamber adjacent the first end of the cylinder member and the second working chamber adjacent the second end of the cylinder member;

passage means for interconnecting the first and second working chambers, said passage means forming a first flow path and a second flow path, said first flow path including a first valve means which is responsive to the direction of movement of the piston rod member with respect to the cylinder member such as to close the first flow path on inward movement and to open the first flow path an outward movement, said second flow path including an axial bore passing through the piston rod member and having an opening in the inner end of the piston rod member for opening into the first working chamber and a radial bore which is interconnected to the axial bore, passes through the piston rod member and has an opening in the side of the piston rod member, said opening in the side of the piston rod member opening into the second working chamber until the piston rod member in its travel from the inner terminal position to the outer terminal position reaches a terminal section as it approaches its outer terminal position;

the second flow path being open for flow in both directions for either direction of axial movement of the piston rod member between the first and second working chambers until the piston rod member reaches said terminal section; and means for fixing the position of said terminal section including means for separating the piston rod side opening of the second flow path from the second working chamber for both flow directions through said second flow path when the piston rod member reaches said terminal section;

said fixing means including means forming an annual chamber between said second working chamber and the second end of the cylinder and means for completely blocking flow between said annular chamber and said second working chamber when the piston rod member reaches and passes above said terminal section;

said spring device pivotally connected between said basic construction unit and said moveable construction unit for assisting movement of said moveable construction unit with respect to said basic construction unit against gravitational forces, the piston rod member of said spring device entering into said terminal section of movement before the moveable construction unit arrives at said upper terminal position.

13. A construction assembly as set forth in claim 12, a pressure of gas within said spring device which is insufficient to maintain said movable construction unit (21) in a position adjacent said upper terminal position in which said second flow path is open.

14. A construction assembly in accordance with claim 12 in which the spring device further includes means forming in the cavity a volume balancing chamber, a helical compression spring in the volume balancing chamber for maintaining pressure, and a liquid partially filling the cavity.

* * * * *

UNITED STATES PATENT AND TRADEMARK OFFICE
CERTIFICATE OF CORRECTION

PATENT NO. : 4,650,165

DATED : March 17, 1987

INVENTOR(S) : Martin Siemann

It is certified that error appears in the above-identified patent and that said Letters Patent is hereby corrected as shown below:

Col. 6, line 39, after "chamber" insert a comma;
Col. 6, line 62, "wich" should read --which--;
Col. 7, line 23, "an" should read --on--;
Col. 8, line 10, "annual" should be --annular--.

Signed and Sealed this

First Day of September, 1987

Attest:

DONALD J. QUIGG

Attesting Officer

Commissioner of Patents and Trademarks